United States Patent [19]
Iida et al.

[11] Patent Number: 5,941,711
[45] Date of Patent: Aug. 24, 1999

[54] KARAOKE APPARATUS WITH A PERSONAL DATA READING FUNCTION

[75] Inventors: Toshiya Iida; Tadashi Sugiyama; Keizyu Anada, all of Shizuoka-ken, Japan

[73] Assignee: Yamaha Corporation, Hamamatsu, Japan

[21] Appl. No.: 08/634,644

[22] Filed: Apr. 18, 1996

[30] Foreign Application Priority Data

Apr. 21, 1995 [JP] Japan ................................. 7-096695

[51] Int. Cl.⁶ .............................. G09B 15/02; G10H 1/36; H04N 5/78
[52] U.S. Cl. ................................ 434/307 A; 434/307 R; 369/2; 84/609
[58] Field of Search .................. 434/307 R–309, 434/318, 365; 84/477 R, 601, 603, 609, 610, 625, 630, 631, 634–638, 645; 369/2, 4, 22, 32, 34, 48, 50, 83, 178, 192; 360/1.9, 33.1, 32, 49, 69, 70, 721.1, 77.01, 98.04, 137; 381/81, 82, 119; 463/25, 41; 386/55; 348/488, 552, 571, 678

[56] References Cited

U.S. PATENT DOCUMENTS

| | | | |
|---|---|---|---|
| 5,131,311 | 7/1992 | Murakami et al. | 434/307 A |
| 5,218,580 | 6/1993 | Okamura et al. | 369/2 |
| 5,247,126 | 9/1993 | Okamura et al. | 434/307 A |
| 5,542,000 | 7/1996 | Semba | 434/307 A X |
| 5,606,143 | 2/1997 | Young | 434/307 A X |

*Primary Examiner*—Joe H. Cheng
*Attorney, Agent, or Firm*—Pillsbury Madison & Sutro LLP

[57] ABSTRACT

A customer holds a personal data card (personal data card) which stores data of five music pieces including music-piece codes of favorite karaoke music pieces, and the key and tempo setting of the music pieces as my-song data. The customer inserts the personal data card into a card insertion slot. The five my songs are assigned to music-piece selection switches, respectively. The music pieces can be selected only by turning on one of the music-piece selection switches. Unlike a usual music-piece selection, therefore, it is not required to input a music-piece code consisting of five to seven digits. When a start switch is turned on thereafter, the music piece is started. Prior to the start, the key and tempo stored in the personal data card are set. Therefore, the setting with which the customer sings the song in best conditions can be automatically performed. In addition, when favorite setting of a favorite song is obtained during the performance of a karaoke music piece, the music-piece code and the setting data of the music piece are written into the personal data card by turning on a writing switch. At the next time and thereafter, the music piece and the setting can be selected by turning on only the music-piece selection key or one-flick selection.

7 Claims, 5 Drawing Sheets

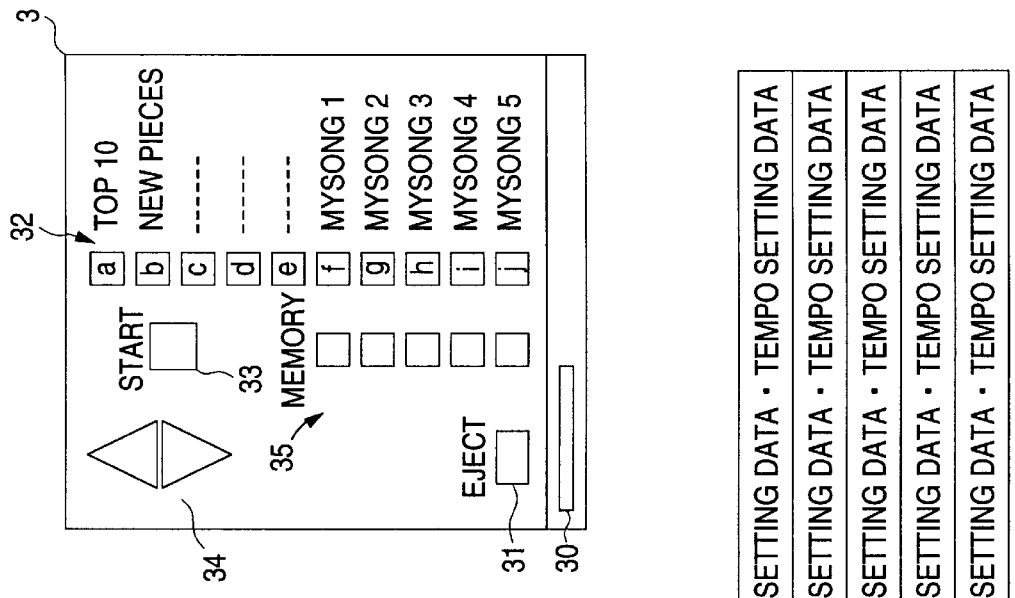

KARAOKE APPARATUS WITH A PERSONAL DATA READING FUNCTION

BACKGROUND OF THE INVENTION

1. Field of the Invention

The invention relates to a karaoke apparatus with a personal data reading function in which personal data of a customer are read so as to facilitate selection of music pieces and settings for the customer in a karaoke parlor or the like.

2. Related art

A karaoke music piece is generally selected in the following procedure in a typical karaoke parlor. (1) A customer searches a book of contents showing a list of karsoke music pieces for a music piece which the customer wants to sing. (2) A music-piece code (5 to 7 digits) of the music piece is input by using a remote controller. (3) Immediately before or during the performance of the music piece, the customer changes the key and/or the tempo in accordance with the customer's preference.

An described above, the operational procedure required for singing one karaoke music piece is complicated and troublesome. For a person who often sings karaoke music pieces, most of music pieces which the person often sings are substantially the same in terms of the above described procedural steps numbered (2) and (3). In many cases, the key settings and the tempo settings for the music pieces are previously determined in accordance with the person's preference. Nevertheless, a burdensome repetition of the same operation is always required for singing the same music piece. Such troublesome operations causes the service for a so-called regular customers to degrade.

SUMMARY OF THE INVENTION

It is an object of the invention to provide a karaoke apparatus with a personal data reading function in which a personal data card for storing a music-piece code of a favorite music piece and favorite setting of the music piece selected by a customer is provided so that one-flick selection of a favorite music piece is done by reading the card.

The present invention is provided that the karaoke apparatus comprises: a personal data card having a selected music-piece data storing area for storing selected music-piece data including at least a music-piece code; card reading means for accepting the personal data card and for reading contents of the card; and karaoke starting means for starting a performance of a karaoke music piece identified by a music-piece code read by the card reading means The present invention is provided that the selected music-piece data storing area comprises an area for storing key data and tempo data of a music piece corresponding to the music-piece code, and when a karaoke music piece identified by the music-piece code is to be started, the karaoke starting means starts the karaoke music piece after setting a key and a tempo based on the key data and tempo data.

The present invention is provided that the karaoke apparatus further comprises: a writing switch; and writing means for, when the writing switch is turned on after the personal data card is accepted, writing at least a music-piece code of a karaoke music piece which in selected or played at the time, into the personal data card.

According to the present invention, a customer holds a personal data card having a selected music-piece data storing area for storing selected music-piece data such as a music-piece code. The karaoke apparatus accepts the personal data card and reads the contents thereof, and then starts the performance of a karaoke music piece identified by the music-code based on the read contents. With this configuration, when the customer allows the personal data card to be read by the karaoke apparatus, the performance of the karaoke music piece can be started by a so-called one-flick selection.

According to the present invention, key data and tempo data of the music piece are stored in the selected music-piece data storing area. At the start of the karaoke, prior to the start of the performance of the music piece, the key and the tempo are set based on the key data and the tempo data. With this configuration, it in possible to automatically not the key and the tempo with which the customer can sing in best conditions. As a result, the customer can sing the karaoke music piece with the optimum setting without performing any additional operation except for the one-flick selection.

According to the present invention, the writing switch is disposed in addition to the above-mentioned configuration. When the writing switch is turned on after the personal data card is accepted, data such as a music-piece code of a karaoke music piece which is selected/played at that time are written into the personal data card. With this configuration, when the customer thinks that the music-piece code and the setting for the music piece which the customer currently sings are optimum, the customer is required only to turn on the writing switch, so as to write them into the personal data card. At the next time and thereafter, the music piece is enabled to be sung with the setting, by one-flick selection.

BRIEF DESCRIPTION OF THE DRAWINGS

FIG. 2 is a view showing a panel configuration of a card reader unit of the karaoke apparatus with a personal data reading function;

FIG. 3 in a diagram showing a memory configuration of a personal data card which is used in the karaoke apparatus with a personal data reading function;

DETAILED DESCRIPTION OF THE PREFERRED EMBODIMENTS

A karaoke apparatus with a personal data reading function which is an embodiment of the invention will be described with reference to the accompanying drawings. The karaoke apparatus with a personal data reading function accepts a memory card which is held by a customer, and assigns music-piece codes stored in the personal data card to individual switches, so that each of the music pieces can be played by turning on the corresponding switch.

Figure 1:
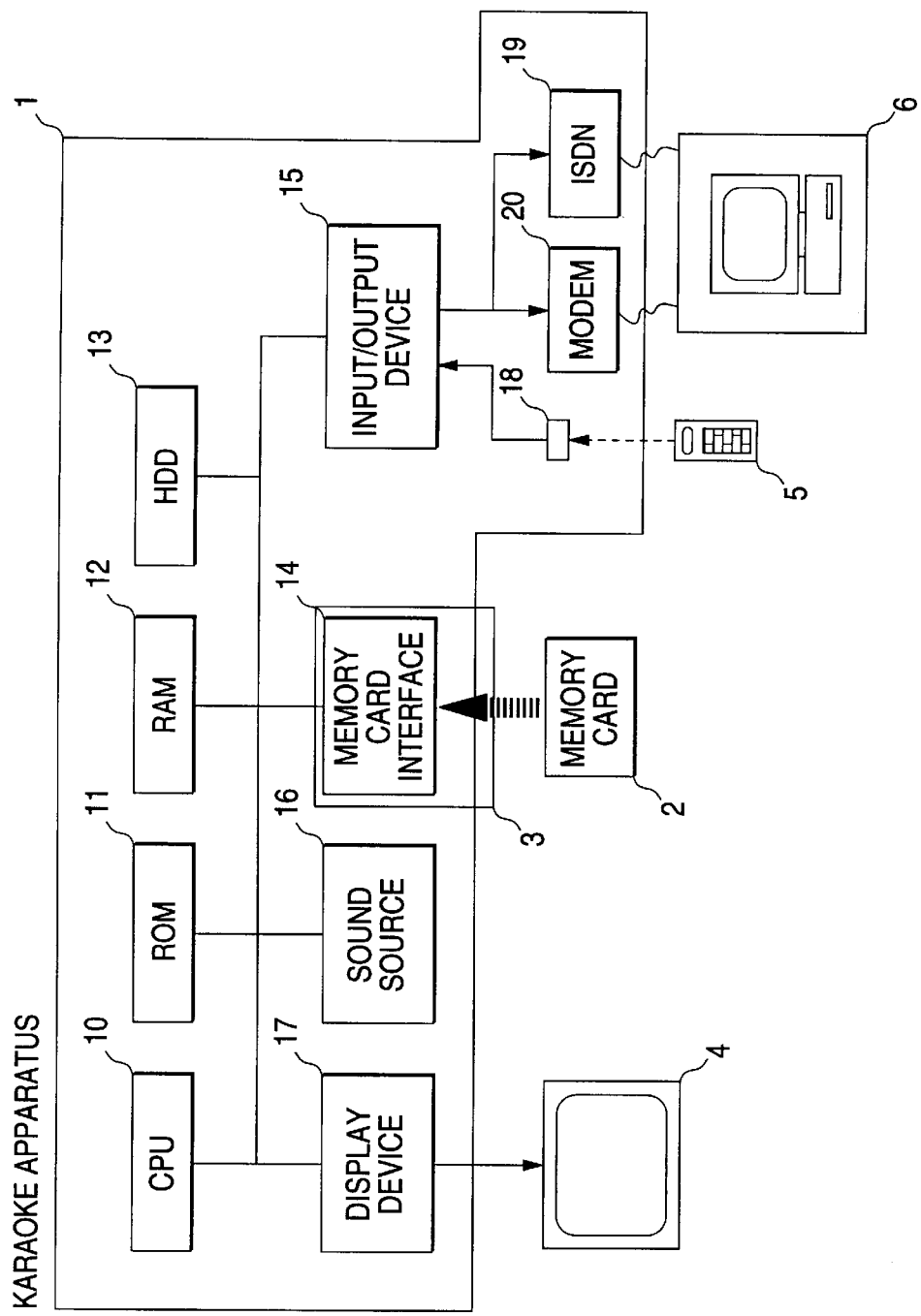
FIG. 1 is a block diagram of a karaoke apparatus with a personal data reading function which in an embodiment of the invention.

FIG. 1 is a block diagram of the karaoke apparatus with a personal data reading function. The karaoke apparatus 1 comprises a card reader unit 3 which is to be operated by a customer. The card reader unit 3 contains a memory card interface 14 therein. When a personal data card is inserted through a card insertion slot 30 (see FIG. 2), the personal data card is connected to the memory card interface 14. The memory card interface 14 is connected to a CPU 10 via a bus. In addition to the memory card interface 14, a ROM 11, a RAM 12, an HDD 13, an input/output device 15, a sound source 16, and a display device 17 are connected to the CPU 10 (bus). The ROM 11 previously stores various programs such as sequence program for controlling the operation of the karaoke apparatus. The sequence programs are those for sequentially reading musical data which have been read from the HDD 13 or a host apparatus 6 to the RAM 12, in accordance with a tempo clock signal, so as to execute a karaoke performance. In the RAM 12, areas are set such as an area for storing card data which have been read from the personal data card 2, and an area into which musical data for executing a karaoke performance in written. The HDD 13 stores musical data of several thousands of music pieces which are downloaded from the host apparatus 6. An infrared remote control receiver unit 18, an ISDN interface 19, and a modem 20 are connected to the input/output device 15. The infrared remote control receiver unit 18 receives an infrared signal transmitted from a remote controller 5. The remote controller 5 is provided with numerical switches, music-piece selection switches, and the like, and is used for usual selection of a music piece by inputting one of music-piece codes shown in a so-called book of contents. Both the ISDN interface 19 and the modem 20 are connected to the host apparatus 6. Operations such an polling, and transmission and receiving of the download list are performed via the modem 20 at a low transmission rate, and the downloading of musical data is performed via an ISDN line at a high transmission rate. The display device 17 is a device for developing background image data and word data included in the musical data. The developed image data are displayed on a monitor 4. When the personal data card 2 is read, a list of data such as my-song data stored in the card are displayed.

Referring to FIG. 3, the configuration of the personal data card 2 will be described. The personal data card 2 is a magnetic card which is usually used as a so-called telephone card, or the like. Data of about 80 bytes can be written into such a magnetic card. The cost of one card is not expensive for example, about 20 yens so that such cards can be easily used as cards distributed to customers by a karaoke parlor. Each card stores card type data indicating that the card is a personal data card, a card ID, a parlor ID, an issue date, the name of a customer, the birthday or a constellation, my-song data, CRC, and the like. The MY-SONG data include music-piece codes of five music pieces, key setting data, and tempo setting data.

Figure 4:
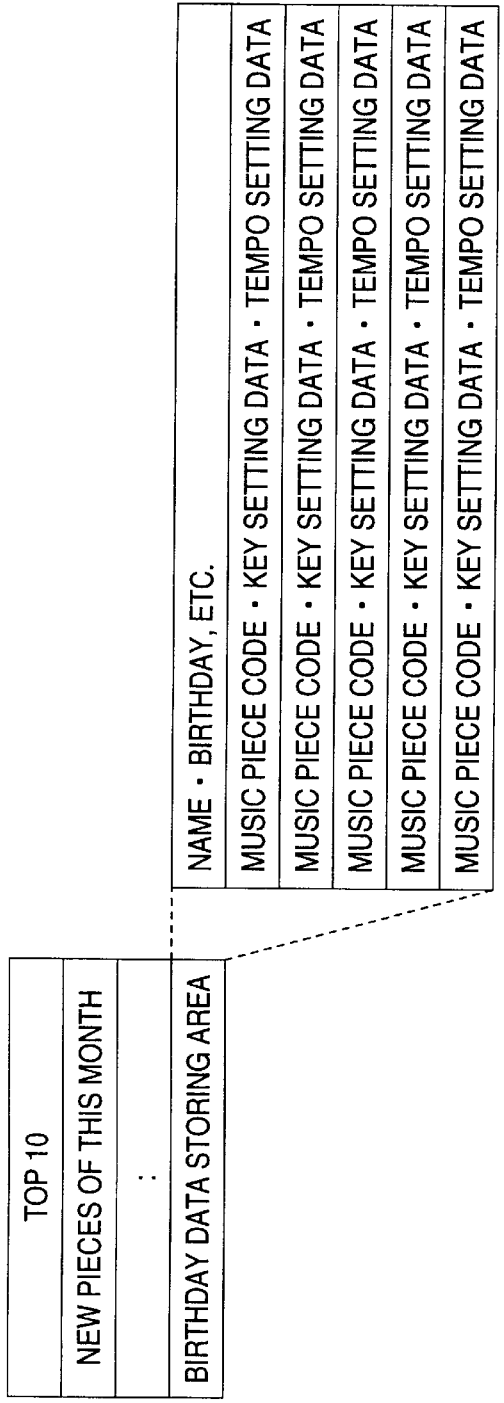
FIG. 4 is a diagram showing the configuration of a part of a RAM of the karaoke apparatus with a personal data reading function.

FIG. 4 is a diagram showing part of the configuration of the RAM 12 of the karaoke apparatus. In the RAM 12, in order to allow a customer to easily select a music piece, music pieces which are frequently requested (selected) are extracted, and stored in special areas. Switches corresponding to these music pieces are disposed separately from the remote controller 5. As the special areas, as shown in the figure, a TOP-10 storing area, an area for storing new pieces of this month, and a my-song data storing area are set. The TOP TEN means the music pieces in the top to tenth places which are most frequently requested, and in automatically updated in accordance with requested accepted by the karaoke apparatus. The NEW PIECES OF THIS MONTH are new karaoke music pieces added in this month, and are automatically updated by downloading the new pieces from the host apparatus 6. The my-song data are the data of five music pieces stored in the personal data card, and read from the personal data which are set in the card reader unit 3.

FIG. 2 is a view showing a panel face of the card reader unit 3. On the panel face, disposed are the insertion slot 30 for a personal data card, an eject switch 31, music-piece selection switches 32, a start switch 33, cursor keys 34, and writing switches 35. The music-piece selection switches 32 include a plurality of switches 32a to 32j. Among them, the music-piece selection switch 32a in assigned to the TOP 10, the music-piece selection switch 32b to the new pieces of this month, and the music-piece selection switches 32f to 32j to my songs. That is, each of the selection switches 32a and 32b is assigned to a plurality of music pieces. When the user turns on the music-piece selection switch 32a or 32b, a title list of the TOP 10 or the new pieces of this month is displayed on the monitor 4 (see FIG. 7(D)). The user selects one of the music pieces by operating the cursor keys 34. When the user turns on the start switch 33 after the selection, the selected music piece is started. In contrast, when one of the music-piece selection switches 32f to 32j for my songs is turned on, the title, the key setting, and the tempo setting of the music piece which is assigned to the music-piece selection switch among the five music pieces an my songs are displayed. When the start switch 33 in turned on, the music piece is started.

Five writing switches 35 are disposed correspondingly to the music-piece selection switches 32f to 32j serving as the music-piece selection switches for my songs. If one of the writing switches 35 is turned on during a karaoke performance, the music-piece code, the key setting, and the tempo setting of the karaoke music piece which in now being played are stored in an area corresponding to the turned-on writing switch of the my-song data storing area of the RAM 12, That is, the previous data are overwritten by the new data. When the personal data card 2 is ejected, the contents of the my-song data storing area of the RAM 12 are transferred to the my-song data storing area of the personal data card 2. Accordingly, if a person who sings a song likes the song and the setting, the person turns on the writing switch 35 so that the music piece and the setting are stored in the personal data card.

The music-piece selection switches 32c to 32e are spare switches. In the embodiment, when one of the music-piece selection switches 32a and 32b is turned on, a list of a plurality of music pieces is displayed on the monitor 4, and, when one of the music-piece selection switches 32f to 32j is turned on, only one music piece corresponding to the switch is displayed. Alternatively, each of the music-piece selection switches 32a to 32e may be assigned to a single music piece, or each of the music-piece selection switches 32f to 32j may be assigned to a plurality of music pieces.

In the case where the apparatus is modified so that a plurality of personal data cards are simultaneously read, for example, each of the music-piece selection switches 32f to 32j for my songs may be assigned to a single personal data card. In this case, when one of the music-piece selection switches is turned on, my-song data of five music pieces stored in the card are displayed as a list on the monitor 4.

Figure 5:
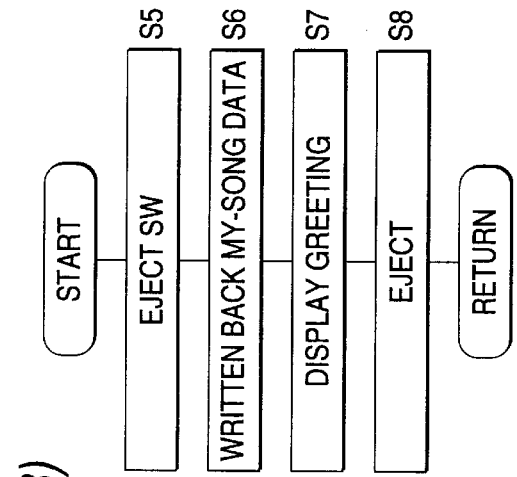
FIGS. 5 (A) and (B) are flowcharts showing the operation of the karaoke apparatus with a personal data reading function.
Figure 5:
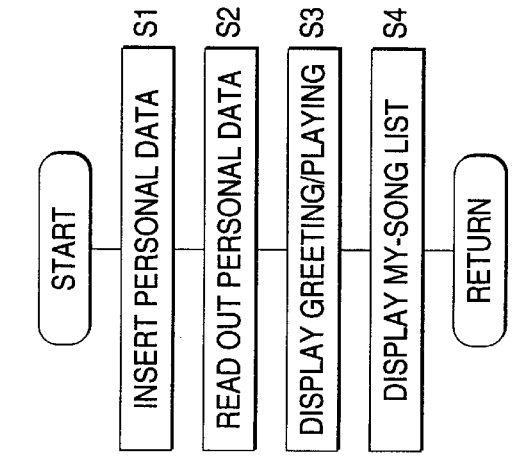
Figure 6:
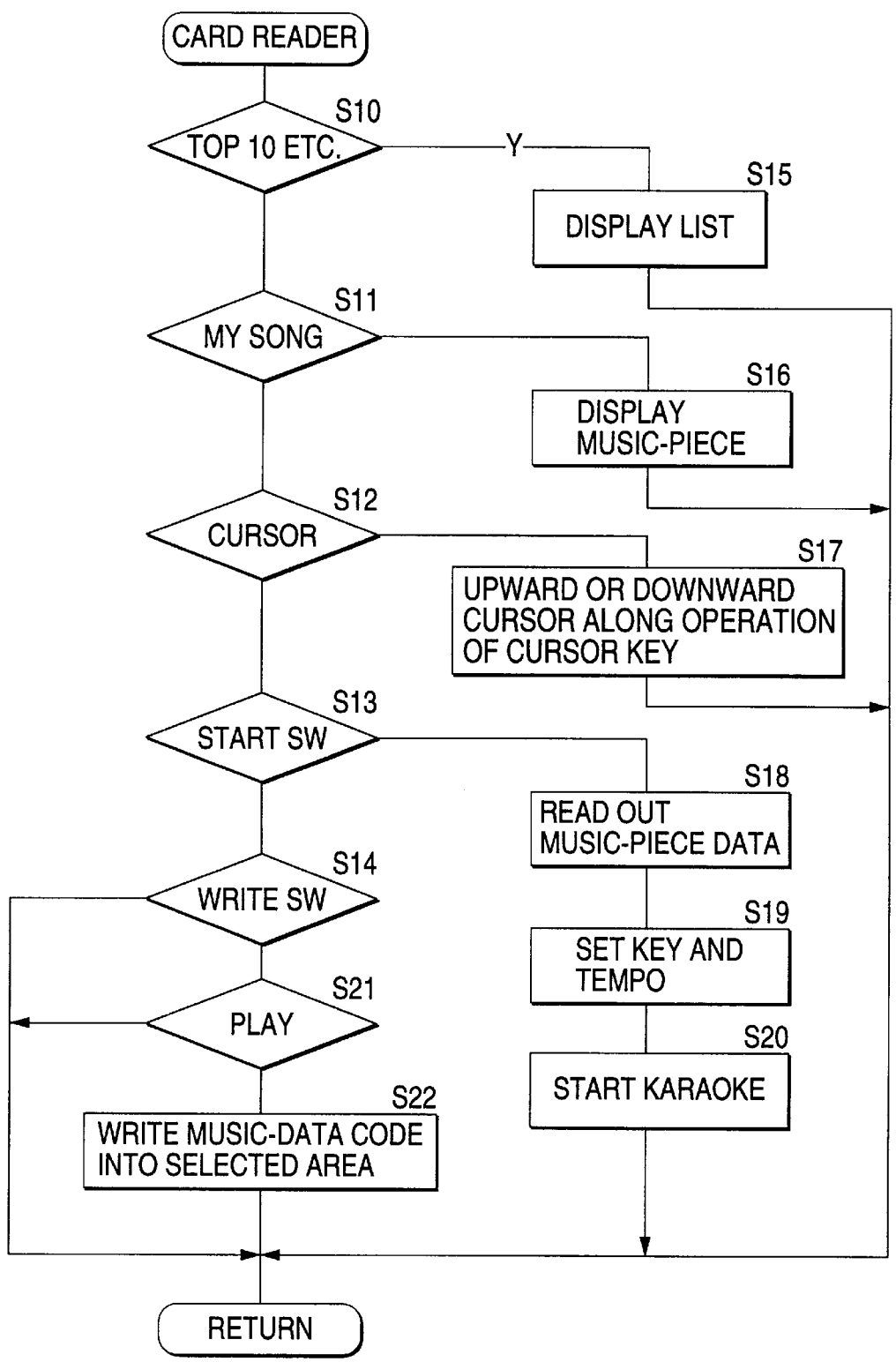
FIG. 6 is a flowchart showing the operation of the karaoke apparatus with a personal data reading function.
Figure 7:
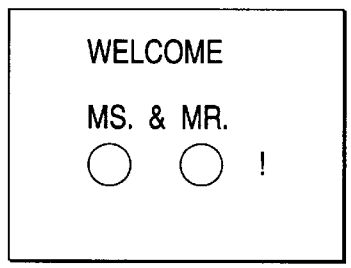
FIGS. 7 (A)–(F) are views showing examples of the display on a monitor of the karaoke apparatus with a personal data reading function.
Figure 7:
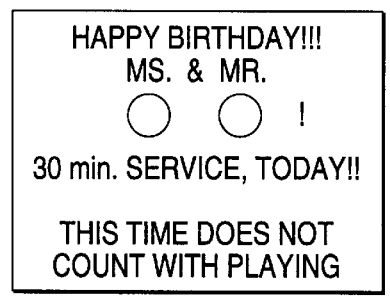
Figure 7:
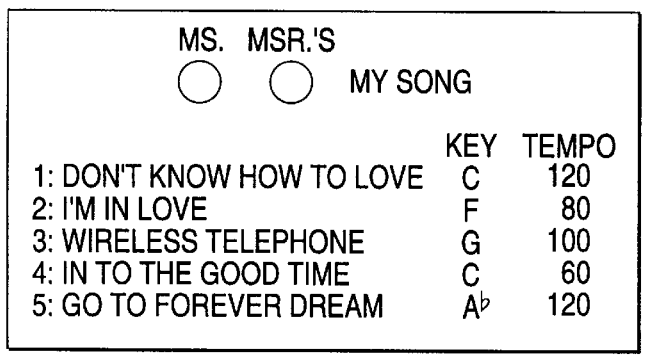
Figure 7:
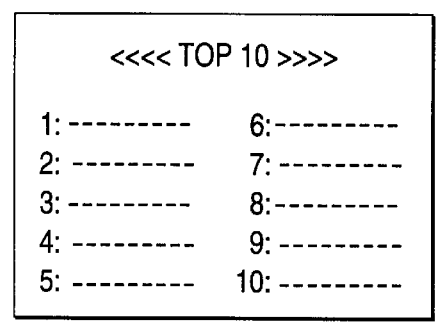
Figure 7:
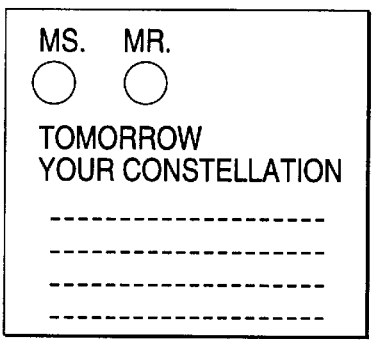
Figure 7:
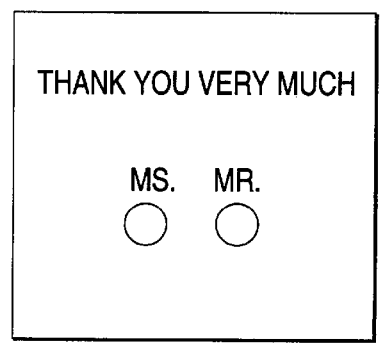

The operation of the karaoke apparatus will be described with reference to the flowcharts of FIGS. 5 and 6, and examples of the display on the monitor 4 shown in FIG. 7. In FIG. 5, (A) is a flowchart showing the operation performed when a personal data card is inserted. When a personal data card 2 in inserted into the card insertion slot 30 (S1), personal data are road out from the card and then written into the personal data storing area of the RAM 12 (62). Thereafter, the displays in (A) and (B) of FIG. 7 and the like are performed based on the readout personal data such as the name and the birthday (83). In FIG. 7, (A) show a usual display, and (B) is an example of the display conducted in the case where the day is the birthday of a person who holds the card. In addition to the display on the monitor 4, a short music piece (e.g., "Happy birthday to you") is automatically played. The display contents include a display for indicating that the time of the automatic play is not added to the use period, and a display for indicating that a free extension of the use period by 30 minutes is done as a birthday present. The extension procedure of the use period is automatically performed by the host apparatus. After the congratulation display, the my-song list is displayed (S4 see (C) of FIG. 7). The my-song list includes titles of music pieces, and key settings and tempo settings of the music pieces.

Next, the operation performed when the karaoke apparatus in to be used will be described with reference to FIG. 6. FIG. 6 shows the operation which is performed in response to the operation of the card reader 3. In steps S10 to S14, it is determined by scanning the switches to check whether the apparatus is operated by the user or not. When one of the music-piece selection switches 32a and 32b for TOP-10 and new pieces of this month is turned on, the process proceeds from S10 to S15 where a title list of music pieces of the selected genre (TOP-10 or new pieces of this month) is displayed (S15). When one of the music-piece selection switches 32f to 32j for my songs in turned on, the my-song data storing area of the RAM 12 is searched, and my-song data of one music piece corresponding to the turned-on music-piece selection switch are displayed. In this case, the title of the music piece is searched for based on the music-piece code stored in the my-song data storing area, and the title of the music piece is then displayed. When one of the cursor keys 34 is operated (S12 ), the cursor is moved upward or downward correspondingly to the operation of the cursor key (S17). When a title list is displayed on the monitor 4, the cursor keys 34 are used for selecting one of the music pieces in the title list. As the title list, when the personal data card 2 is inserted, a title list of my songs is displayed (see step S4), and, when the music-piece selection switch 32a or 32b is turned on, a title list of TOP 10 or new pieces of this month in displayed. When the start switch 33 is turned on (S13), the musical data of a music piece which is selected at that time is written into the RAM 12 (S18), and the key and the tempo of the music piece are set (S19). Thereafter, the karaoke performance is started (S20). The key and the to are met only when preset data such as the my-song data are previously stored.

As described above, the selection of my song can be performed by turning on one of the music-piece selection switches 32f to 32j. Alternatively, in a condition where the list of my songs is displayed on the monitor 4, the selection of my song may be performed by operating the cursor keys 34.

When one of the writing switches 35 is turned on, it is judged whether any karaoke music piece is now being played or not (S21). If no music piece is being played, it is impossible to specify music-piece data to be written, and hence the writing operation is skipped. If a karaoke music piece is being played, the music-piece code of the karaoke music piece which is now being played and the key setting data and tempo setting data which are not at that time are written into an area corresponding to the turned-on writing switch of the my-song storing area (S22).

When the remote controller 5 in operated, a usual music-piece selection operation is performed. During the selection of music pieces, a display including the contents based on the personal data such an a fortune shown in (C) of FIG. 7 may be displayed.

Returning to FIG. 5(B), the operation conducted when the eject switch 31 in turned on will be described. When the eject switch 31 is turned on (S5), the stored contents of the my-song data storing area of the RAM 12 are written back into the my-song data storing area of the personal data card 2 (S6). In the case where my-song data are newly stored by operating one of the writing switches 33, therefore, the personal data card 2 can be updated by the data. Thereafter, a greeting screen such as shown in (P) of FIG. 7 is displayed (S7) and the card is ejected (S8). When the card is ejected, it is assumed that the use of the karaoke apparatus is terminated.

As described above, in the embodiment, the display such as the greeting, and the fortune can be performed based on the read personal data. In addition, the my-song data can be read so that the macro functions of one-flick selection and one-flick setting are executed. When the user likes the karaoke music piece which in now being played, and the getting thereof, the user can turn on one of the writing switches 35 so that the music-piece code and the key and tempo setting thereof are stored. Accordingly, a customer who sings the same music piece many times can easily select the music piece.

In the embodiment, the card reader unit 3 is directly disposed on the karaoke apparatus 1. Alternatively, the card reader unit may be a wireless one in the same manner as the remote controller 5 do that the data are transmitted via infrared rays or the like. Preset data may be stored in a data terminal which is held by a customer, such as an electronic organizer having an infrared transmission function, and the karaoke apparatus 1 may receive the preset data through the infrared remote control receiver unit 18.

As described above, in the embodiment, the music-piece selection switches 32f to 32j are respectively provided for a plurality (five) of sets of my-song data. Namely, in other words, the karaoke apparatus can be described in the following manner A karaoke apparatus with a personal data reading function, wherein said personal data card has the selected music-piece data storing area for a plurality of music pieces, and a plurality of said specifying switches are disposed correspondingly to said plurality of music pieces.

The function and effect of the claim is an follows: According to the invention, the personal data card has a selected music-piece data storing area for a plurality of music pieces, and a plurality of specifying switches are disposed correspondingly to the plurality of music pieces. With this configuration, the user's own repertory pieces can be stored in the card, and the user can successively sing the music pieces by performing only a simple music-piece selection operation.

In other words, according to the invention, since the personal data card has a selected music-piece data storing area for a plurality of music pieces, selection of a plurality of music pieces can be easily performed, and it is possible to successively sing a plurality of music pieces by performing only a simple music-piece selection operation.

As described above, according to the invention, the music-piece selection is performed based on a music-piece code(s) stored in the personal data card. With this configuration, when a customer allows the personal data card to be road by the karaoke apparatus, the performance of a karaoke music piece can be started by a so-called one-flick selection. As a result, the service for customers can be enhanced.

According to the invention, key data and tempo data of the music piece are stored in the selected music-piece data storing area. At the start of the karaoke performance, the key and the tempo are set based on the key data and the tempo data With this configuration, it in possible to automatically set the key and the tempo with which the customer can sing in best conditions. As a result, the customer can sing the karaoke music piece with the optimum setting without performing any additional operation except for the piece selection operation.

According to the invention, the writing switch in disposed for writing data such as a music-piece code of a karaoke music piece which is selected/played at that time, into the personal data card. With this configuration, when the customer thinks that the music-piece code and the setting of the music piece which is now being sung are optimum, the customer is required only to turn on the writing switch, so as to write them into the personal data card. At the next time and thereafter, the music piece is enabled to be sung with the setting, by one-flick selection.

What is claimed is:

1. A karaoke apparatus with a personal data reading function comprising:

a personal data card having a selected music-piece data storing area for storing selected music-piece and setting data including at least a music-piece code;

card reading means for accepting said personal data card and for reading contents of said card; and karaoke starting means for starting a performance of a karaoke music piece identified by a music-piece code read by said card reading means.

2. A karaoke apparatus with a personal data reading function according to claim 1, wherein said selected music-piece data storing area comprises an area for storing key data and tempo data of a music piece corresponding to said music-piece code, and when a karaoke music piece identified by said music-piece code is to be started, said karaoke starting mans starts said karaoke music piece after setting a key and a tempo based on said key data and tempo data.

3. A karaoke apparatus with a personal data reading function according to claim 1, further comprising:

a writing switch; and writing means for writing at least a music-piece code of a karaoke music piece which is at least one of selected and played at the time into said personal data card, when said writing switch is turned on after said personal data card is accepted.

4. A karaoke apparatus with a personal data reading function according to claim 2, further comprising:

a writing switch; and writing means for writing at least a music-piece code of a karaoke music piece which is at least one of selected and played at the time into said personal data card, when said writing switch is turned on after said personal data card is accepted.

5. A karaoke apparatus with a personal data reading function according to claim 1, further comprising:

an automatic greeting message displayed based upon data read from said personal data card.

6. A karaoke apparatus with a personal data reading function according to claim 1, further comprising:

an automatic fortune telling message displayed based upon data read from said personal data card.

7. A karaoke apparatus with a personal data reading function according to claim 1, wherein said personal data card stores play environment data for five my-song selections further comprising at least music-piece code data, key data and tempo data for each said my-song selection.

* * * * *